(12) United States Patent
Pabla et al.

(10) Patent No.: US 6,916,529 B2
(45) Date of Patent: Jul. 12, 2005

(54) HIGH TEMPERATURE, OXIDATION-RESISTANT ABRADABLE COATINGS CONTAINING MICROBALLOONS AND METHOD FOR APPLYING SAME

(75) Inventors: Surinder Singh Pabla, Greer, SC (US); Farshad Ghasripoor, Scotia, NY (US); Yuk-Chiu Lau, Ballston Lake, NY (US); Liang Jiang, Guilderland, NY (US); Canan Uslu Hardwicke, Niskayuna, NY (US); William Emerson Martinez Zegarra, Paucarpata (PE)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 10/338,671

(22) Filed: Jan. 9, 2003

(65) Prior Publication Data

US 2004/0137259 A1 Jul. 15, 2004

(51) Int. Cl.$^7$ .......................... B32B 15/04; B32B 3/26; F03B 3/12
(52) U.S. Cl. .................... 428/325; 428/335; 428/312.2; 428/313.3; 428/312.6; 428/312.8; 428/314.4; 428/314.8; 428/318.4; 428/680; 428/655; 428/650; 416/241 R
(58) Field of Search ................................ 428/323, 325, 428/332, 336, 304.4, 312.2, 313.3, 312.8, 312.6, 314.4, 314.8, 318.4, 650, 655, 660, 679, 680, 335; 415/173.4, 174.4, 230; 277/414, 415; 416/241 R, 241 B

(56) References Cited

U.S. PATENT DOCUMENTS 3,346,175 A 10/1967 Wiles
3,574,455 A 4/1971 Mix et al.
3,843,278 A 10/1974 Torell (Continued)

OTHER PUBLICATIONS

"Hy–Tech Thermal Solutions, Insulating Paints & Ceramic Paint Additive" from website www.ceramicadditive.com, no date.
3M Manufacturing & Industrial website: "3M•Z–Light Spheres•Ceramic Microspheres," "Low–density ceramic microspheres that offer lower cost for many applications Potential enhancements: sandability/machinability, conductivity reduction, high temperature resistance . . . ", no date.

*Primary Examiner*—Jennifer McNeil
(74) *Attorney, Agent, or Firm*—Nixon & Vanderhye P.C.

(57) ABSTRACT

An abradable coating composition for use on shrouds in gas turbine engines or other hot gas path metal components exposed to high temperatures containing an initial porous coating phase created by adding an amount of inorganic microspheres, preferably alumina-ceramic microballoons, to a base metal alloy containing high Al, Cr or Ti such as β-NiAl or, alternatively, MCrAlY that serves to increase the brittle nature of the metal matrix, thereby increasing the abradability and oxidation resistance of the coating at elevated temperatures. Coatings having a total open and closed porosity of between 20% and 55% by volume due to the presence of ceramic microballoons ranging in size from about 10 microns to about 200 microns have been found to exhibit excellent abradability for applications involving turbine shroud coatings. An abradable coating thickness in the range of between 40 and 60 ml provides improved performance for turbine shrouds exposed to gas temperatures between 1380° F. and 1800° F. Abradable coatings in accordance with the invention can be used for new metal components or to repair existing equipment. The coatings can be applied to the metal shroud using thermal spray, processes that integrate sintering and brazing, or direct write techniques.

12 Claims, 4 Drawing Sheets

U.S. PATENT DOCUMENTS

| | | | |
|---|---|---|---|
| 3,879,831 A | * | 4/1975 | Rigney et al. |
| 4,303,737 A | * | 12/1981 | Litchfield et al. |
| 4,330,575 A | * | 5/1982 | Litchfield et al. |
| 4,423,097 A | * | 12/1983 | Mons et al. |
| 4,460,185 A | | 7/1984 | Grandey |
| 4,666,371 A | | 5/1987 | Alderson |
| 5,196,471 A | | 3/1993 | Rangaswamy et al. |
| 5,262,206 A | | 11/1993 | Rangaswamy et al. |
| 5,434,210 A | | 7/1995 | Rangaswamy et al. |
| 5,472,315 A | | 12/1995 | Alexander et al. |
| 5,530,050 A | | 6/1996 | Rangaswamy |
| 5,603,603 A | * | 2/1997 | Benoit et al. |
| 6,322,897 B1 | * | 11/2001 | Borchert et al. |

* cited by examiner

HIGH TEMPERATURE, OXIDATION-RESISTANT ABRADABLE COATINGS CONTAINING MICROBALLOONS AND METHOD FOR APPLYING SAME

BACKGROUND OF THE INVENTION

The present invention relates to coatings applied to metal components exposed to high temperature environments, such as gas turbine engines, radial inflow compressors and radial turbines, including micro-turbines and turbo-chargers. In particular, the present invention involves a new type of abradable coating containing very small ceramic microspheres in the form of a microballoon dispersion metal matrix composite ("MDMMC") which is applied to the surface of metal components. The new abradable coating allows for very close clearance control between the bucket tips and shroud in gas turbine engines, thereby reducing hot gas leakage and improving overall gas turbine efficiency. High temperature abradable coatings embodying some of the same general concepts as the present invention are described in commonly-owned application Ser. No. 09/863,760, the disclosure of which is hereby incorporated by reference.

The present invention also includes a method for applying the new abradable coatings to turbine shrouds in order to improve the long-term performance and efficiency of the turbine blades without requiring that the blades be tipped. Although the invention has been found particularly useful in stage 1 gas turbine engine shrouds, the same abradable coating compositions can be used in any stage of gas turbine engines, as well as on hot gas path metal components of other rotating equipment exposed to high temperature environments. The invention can also be used to repair and/or replace the coatings on metal components already in service, such as turbine shrouds.

It is well known that the high temperatures encountered in early stages of gas turbines creates various problems relating to the integrity, reliability and life expectancy of components coming in contact with the hot gas, particularly the rotating buckets and turbine shroud. One objective of the present invention, like the abradable coatings described in application Ser. No. 09/863,760, is to enable the shroud coating to cope with the high gas temperatures for much longer periods of time while maintaining tight clearances at bucket tips. In order to achieve maximum engine efficiency, the buckets must rotate freely within the turbine housing (shroud) without interference and with the highest possible efficiency relative to the amount of energy available from the expanding working fluid. The highest efficiencies are achieved by maintaining a minimum threshold clearance between the shroud and the bucket tips to thereby prevent unwanted "leakage" of the working fluid over the tips of the buckets. Increased clearances due to premature or excessive bucket wear ultimately result in significant decreases in overall efficiency of the gas turbine engine. Thus, only a minimum amount of leakage of the hot gases at the outer periphery of the buckets, i.e., the small annular space between the bucket tips and turbine housing, can be tolerated without sacrificing engine efficiency.

The need to maintain adequate clearance without significant loss of efficiency is made more difficult by the fact that as the turbine rotates, centrifugal forces acting on the turbine components as well as high operating temperatures cause the buckets to expand radially in the direction of the shroud. Thus, it is important to establish the lowest effective running clearances between the shroud and bucket tips at the maximum anticipated operating temperatures of the working fluid.

In the past, various types of abradable coatings have been applied to the turbine shroud to help create a minimum running clearance between the shroud and bucket tips under steady-state temperature conditions. Typically, such coatings have been applied to the surface of the shroud opposite the buckets using a material that can be readily abraded by the tips of the buckets as they turn inside the housing at high speed with little or no damage to the bucket tips.

A number of design factors must be considered in selecting an appropriate material for use as an abradable coating for a shroud, depending upon the environmental coating composition and properties, substrate material composition/properties, the specific end use, and the operating conditions of the turbine, particularly the highest anticipated working fluid temperature. Ideally, the cutting mechanism (e.g., the bucket blade tips) is sufficiently strong and the coating on the shroud sufficiently brittle at high temperatures to abrade without causing damage to the bucket tips themselves. That is, at the maximum anticipated operating temperatures, the shroud coating should preferentially abrade in lieu of any loss of metal on the bucket tips.

Commonly-owned G.E. application Ser. No. 09/863,760 discusses another important design factor to be considered in the context of abradable shroud coatings, namely the rate of degradation, e.g., oxidation, of the coating due to exposure to hot gases containing oxygen over long periods of time at elevated temperatures. Most prior art coatings, e.g., ceramic abradable coatings, are quite dense and thus require additional bucket tip reinforcement to make them abradable. Another problem relates to the relationship between coating abradability and resistance to oxidation in higher temperature applications. As the gas temperature increases, coating structures become more and more ductile. This increased ductility tends to reduce the ability of the coating to be abraded. Most prior art abradable coatings use higher levels of porosity to compensate for this increased ductility and yet maintain abradability at high temperature. However, the higher porosity tends to reduce the life span of the coatings at high temperatures because the same porosity volume that make the coatings abradable also renders them much more vulnerable to oxidation, particularly in the earlier turbine stages.

Various prior art patents describe abradable coatings for use in turbocompressors and gas turbines. application Ser. No. 09/863,760 describes a coating system having two components: (1) a "fugitive" polymer or other plastic phase (such as polyester or polyimide) that can be burned off without leaving any residue or ash to create a porous coating; and (2) a brittle intermetallic phase, such as β-NiAl or an intermetallic phase former that has superior oxidation resistance as compared to MCrAlY, where M can be CoNi, Fe or Ni. This second component serves to increase the brittle nature of the metal matrix, thereby increasing the abradability of the coating at elevated temperatures. An alternative third phase can also be used, namely, a metallic oxidation-resistant matrix phase such as MCrAlY, e.g., Praxair Co211 (Co32Ni21Cr8Al0.5Y), NiCoCrAlY, FeCrAlY or NiCrAlY, e.g., Praxair Ni211 (Ni22Cr10Al1Y).

A number of other abradable coatings have been used in the past on compressor shrouds and gas turbine components. See, e.g., U.S. Pat. Nos. 3,346,175; 3,574,455; 3,843,278; 4,460,185, 4,666,371 and 5,472,315. Unfortunately, these conventional coatings are not sufficiently durable or resistant to oxidation in higher temperature environments. The prior art coatings tend to oxidize, delaminate or even separate from the shroud substrate as the turbine undergoes thermal cycling during startup and shut down. The poor oxidation resistance of many prior art compositions may be attributable in part to the relatively high porosity levels (about 55% by volume) in the abradable top coat which tend to allow a much higher rate of ingress of oxygen into the coating.

One improved prior art coating known as Sulzer Metco SM2043 consists of MCrAlY together with 15 wt % polyester and 4 wt % boron nitride (hBN). (See U.S. Pat. No. 5,434,210). The MCrAlY component of the SM2043 nominally contains CO25Ni16Cr6.5Al0.5Y and is recommended for applications at approximately 1380° F. without tipped (uncoated) buckets, and up to 1560° F. for tipped buckets. Because the SM2043 material does not abrade well above 1380° F., it can result in non-uniform wear of the shroud coating and/or cause damage to the bucket tips themselves by the rotational impact of the bucket with the shroud metal, ultimately requiring some type of tip reinforcement or coating. In addition, because of the high porosity in coatings using Sulzer Metco SM2043, the oxidation life of the coatings is relatively short at operating temperatures above 1560° F. For example, they begin to show lower oxidation resistance at temperatures above 1380° F., and the resistance level deteriorates significantly above that temperature, with many coatings lasting only a few hundreds or thousands of hours at temperatures approaching the level of early turbine stages (1700° F.), this is one or two orders of magnitude less than the required hours.

Thus, for many years, a significant need has existed in the art for an improved abradable coating for gas turbine shrouds operating at higher than average temperatures, i.e., above 1380° F., which is capable of achieving a longer oxidation life, preferably up to or beyond 24,000 hours, when used at gas temperatures in the 1600–1800° F. range. There is also a significant need for abradable coatings capable of ensuring that the turbine buckets suffer from only minimal wear during startup and shutdown due to cyclic radial expansion and contraction of the turbine components. A need also exists to provide a strong, but abradable coating that will avoid the necessity for tipped blades which might otherwise be required due to the generally non-abradable nature of coatings in the higher temperature ranges of turbine shrouds. Finally, a need exists to provide a coating that will have sufficient erosion resistance over the full anticipated life of the gas turbine equipment, thereby avoiding the need to interrupt operation to maintain and/or prematurely replace the coating.

BRIEF SUMMARY OF THE INVENTION

The present invention provides a high temperature, oxidation-resistant abradable coating system for turbine shrouds that is more effective over time than conventional systems, particularly at gas turbine operating temperatures above 1400° F. up to about 1800° F. The novel composition of the abradable coatings in accordance with the invention allow for very close clearance control between the bucket tips and shroud, thereby further reducing hot gas leakage and improving overall gas turbine efficiency over time as compared to prior art coating systems. The invention includes three different methods for applying the new abradable coatings to gas turbine engine components, i.e., a) conventional thermal spray processes, b) processes integrating sintering and brazing, and c) a direct-write application technique followed by sintering.

It has now been discovered that high oxidation resistance, good abradability and longer operating times can be achieved using a coating that has a matrix composition with high Al, Cr, or Ti concentrations and contains a fixed amount of very small inorganic, hollow microspheres, such as ceramic microballoons, preferably ranging in size from about 10 microns to about 200 microns. The microspheres form a ceramic microballoon dispersion that results in a material with uniform closed porosity having, on the one hand, consistent abradability at higher operating temperatures, i.e., up to about 1800° F., as compared to prior art systems and having, on the other hand, improved oxidation resistance because the microspheres generates closed porosity, which prevents or at least delays the ingression of oxygen from the coating surface. Exemplary ceramic microballoons useful with the invention include aluminabased hollow microspheres consisting of a thin, brittle ceramic shell formed by known methods such as the Sol-gel® process. Zirconia-based microspheres might also be used to provide improved abradability at higher operating temperatures, however such microspheres may not improve the oxidation resistance under circumstances where they connect to open porosity because they tend to be transparent to oxygen at the high temperatures encountered in early stage turbines.

Before being applied to a metal component, the ceramic microballoon dispersion according to the invention is combined with an oxidation-resistant alloy containing high Al, Cr or Ti that serve to increase the oxidation resistance of the coating at elevated temperatures. In addition, the use of monolithic intermetallic β-NiAl (e.g., 68.51wt % Ni and 31.49wt % Al) as a coating or as a dispersed β-NiAl phase in the coating matrix can improve the abradability due to the brittle nature of intermetallics. Moreover, β-NiAl has exceptional oxidation resistance due to the high Al concentration and formation of dense oxide scale which reduces the oxidation rate. The β-NiAl can be used alone or, alternatively, dispersed into a metallic coating matrix, e.g., a metallic oxidation-resistant alloy such as MCrAlY, e.g., Praxair Co211 (Co32Ni21Cr8Al0.5Y), NiCoCrAlY, FeCrAlY or NiCrAlY, e.g., Praxair Ni211 (Ni22Cr10Al1Y).

In order to improve the compatibility of the ceramic microspheres in the metallic oxidation-resistant matrix phase, the microspheres can be used with a low-melting-point metallic powder with additive Si, B, etc., depending on the desired end use. It is known that β-NiAl tends to exhibit slightly better abradability at higher temperatures than MCrAlY. Thus, when the ceramic microballoons are combined with the β-NiAl alone, the resulting uniform dispersion exhibits improved oxidation resistance (due to "closed" porosity created by the ceramic microballoons and the oxidation-resistant nature of β-NiAl), in addition to improved abradability at the same high temperatures. The alternative application of MCrAlY tends to enhance oxidation resistance with high Al and Cr concentration without sacrificing the abradability achieved by the microballoon dispersion.

The entire coating can then be applied to the metal shroud by, for example, conventional thermal spray. The resulting coating consists of a uniform microballoon/metal dispersion having very small micropores of varying sizes within a prescribed range that provide the desired abradability at high temperature, but without sacrificing strength and oxidation resistance. This relative increase in abradability at high temperatures (above 1400° F. up to about 1800° F.) virtually eliminates the need for conventional bucket tipping, while significantly improving the oxidation resistance at the same time.

In an alternative embodiment of the invention, a conventional "fugitive" polymer or other plastic phase (such as polyester or polyimide) can be included with the ceramic microballoons and then burned off without leaving any residue or ash. The use of such polyester or polyamide assists in adjusting and controlling the porosity level (and hence abradability) of the final coating. The porosity level can thus be optimized for maximum abradability and oxidation life, again depending on the specific desired end use and maximum anticipated temperature conditions.

As a still further embodiment, a solid lubricant phase such as hexagonal boron nitride (hBN) can be added to the coating system to promote abradability of the coating. However, because the solid lubricant phase may not be as stable at higher operating temperatures, it may not be useful to add hBN in the very highest temperature environments, i.e., above about 1650° F.

In yet another embodiment of the invention, commercially available fly ash consisting primarily of silicon dioxide, aluminum oxide and iron oxide can be uniformly dispersed with the metal matrix, either alone or in combination with ceramic microballoons in order to create the desired levels of abradability and porosity of the final coating.

One preferred abradable metallic coating system useful for turbine shrouds in accordance with the invention includes the following basic components:

1. An amount of very small (i.e., having an average size of about 80 microns) hollow inorganic microspheres, preferably consisting of an alumina-ceramic, sufficient to increase the coating porosity and abradability of the coating while maintaining an oxidation barrier by slow diffusion of oxygen and metallic ions through the microsphere thickness at elevated temperatures. Alternatively, the coating can include an additional amount of polymer or other plastic phase (such as polyester or polyimide) that can be burned off to help control the total porosity level of the coating;

2. A metallic oxidation-resistant matrix phase with high Al, Cr or Ti, such as MCrAlY [e.g., Praxair Co211 (Co32Ni21Cr8Al0.5Y), NiCoCrAlY, FeCrAlY or NiCrAlY, e.g., Praxair Ni211 (Ni22Cr10Al1Y)]. As noted above, this third component likewise improves the oxidation resistance due to the high Al, Cr or Ti concentration in the alloy, without any loss of abradability at high temperature; and 3. A brittle intermetallic phase, such as β-NiAl(e.g., 68.51 wt % Ni and 31.49 wt % Al) or an intermetallic phase former that serves to increase the brittle nature of the metal matrix and thereby increase the abradability of the coating at elevated temperatures. The β-NiAl has additional merit in that it exhibits excellent oxidation resistance. Further, the use of this phase significantly improves oxidation resistance at high temperature without adversely affecting abradability. The β-NiAl can be used alone as coating or as a dispersed phase in the metallic coating matrix.

Abradable coatings using components (1) and (2) or (3) or, alternatively, all three components, have been found particularly useful for turbine shrouds where the buckets are not tipped (coated) and the shroud is exposed to high operating temperatures up to about 1800° F. The microballoon/metal matrix compositions can be applied to the shroud using conventional thermal spray processes or by processes integrating sintering and brazing. Alternatively, the coating compositions can be applied using a known "micro pen" technique followed by sintering as described herein.

DETAILED DESCRIPTION OF THE INVENTION

Figure 1:
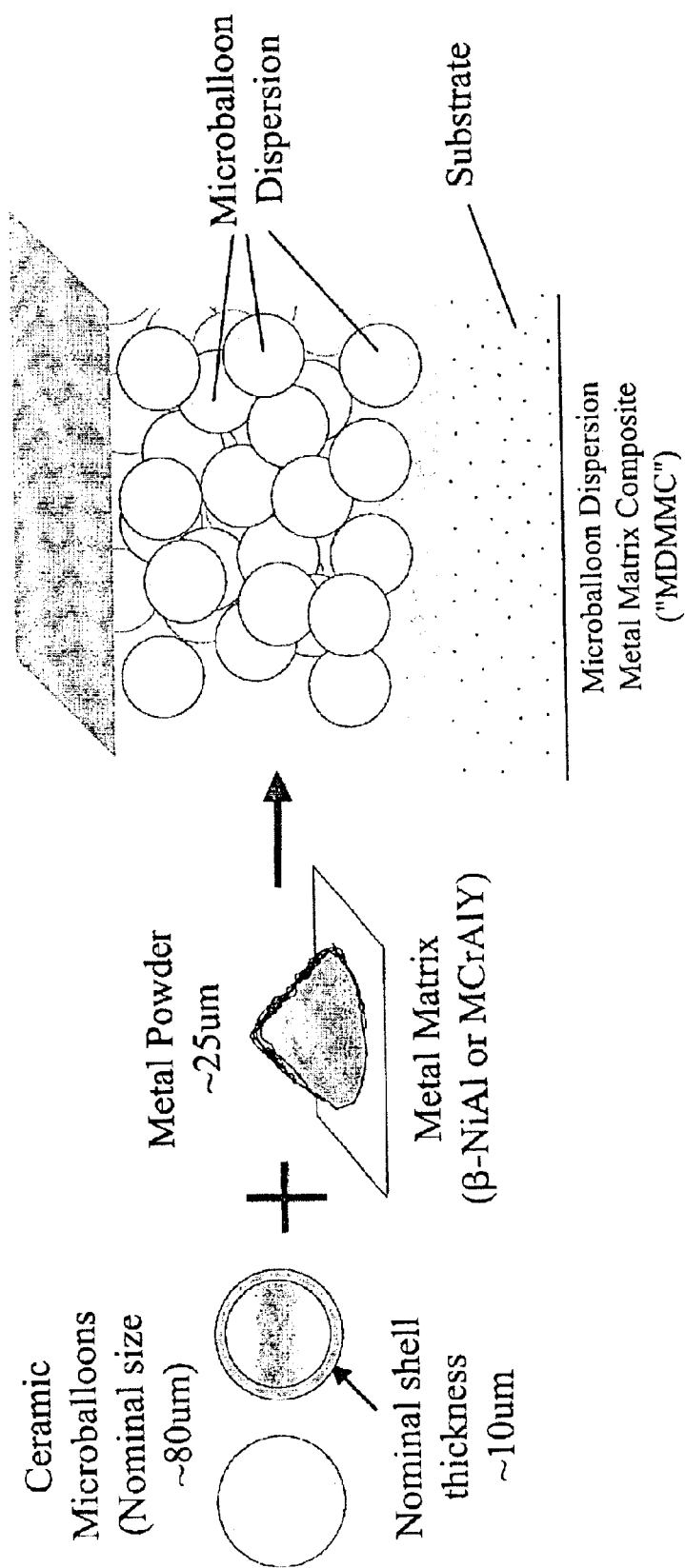
FIG. 1 of the drawings depicts the basic process steps for making an exemplary microballoon dispersion within a metal matrix composite used as an abradable coating according to the invention.

The preferred embodiment of the present invention balances two competing, but very important, coating properties, namely (1) abradability and (2) oxidation resistance. As noted above, abradable coatings according to the invention exhibit improved abradability at high temperature, primarily as a result of the combination of MCrAlY or β-NiAl and the ceramic microballoons. The microballoons provide the desired level of increased brittleness and porosity (and hence good abradability), but also acts as an oxygen barrier to provide the desired level of oxidation resistance at higher operating temperatures due to its formation of closed porosity. The addition of microspheres into β-NiAl or MCrAlY coating matrix creates the unique balance of physical and metallurgical properties in coatings, namely the desired level of porosity and better oxidation resistance at temperatures in the range of 1380° F. to 1800° F. The use of β-NiAl tends to improve the high temperature oxidation resistance of the coating because it exhibits better oxidation resistance than MCrAlY at higher temperatures.

The preferred microballoons are commercially available in sizes ranging from about 10 microns to about 200 microns, such as the low density "Z-light ceramic microspheres" manufactured by the 3M corporation and sold under the product codes "G-3125," "3150" and "3500." Nominally, the conventional ceramic microspheres have an isostatic crush strength of about 2,000 psi and a true density of about 0.7 g/cc. These physical properties are not adversely affected by high temperature environments.

The ceramic microspheres thus consist of low density, very hard, hollow spheres having high ductile strength and good oxygen barrier over a wide temperature range. Normally, microspheres of this type are used to reduce the density of materials, lower VOC levels and/or increase the filler loading of composites. They serve a very different purpose in the present invention after being uniformly dispersed within the metal matrix composite that forms the abradable coating. The microspheres can be dispersed using low shear mixing equipment and adding the microspheres during the "letdown" stage of mixing. A conventional dispersant can also be used to aid in creating a more uniform dispersion during the mixing.

The use of ceramic microspheres represents a significantly different theoretical approach to controlling the porosity and abradability of coatings at high temperatures as compared to the use of polyester alone as described in commonly-owned application Ser. No. 09/863,760. The use of polyester provides an "open porosity" control mechanism (i.e., the spaces resulting from burning the polyester without ash residue) which is more amenable to the ingress of oxygen, as opposed to the "closed porosity" control mechanism which resists the ingress of oxygen. The present invention relies primarily on hollow ("closed") ceramic microspheres of varying sizes to provide the requisite porosity control at high temperature. Nominally, components (1) and (2) or (3) above can be used alone to form an acceptable abradable coating composition with good oxidation resistance. That is, the initial porous coating phase containing microballoons can be combined with the oxidation-resistant metallic coating matrix. The use of (1) and (3) has superior oxidation resistant and abradability due to the nature of β-NiAl, i.e., oxidation resistance and brittleness. In either embodiment, a coating thickness of between 40 and 60 mils has been found to be effective.

In another coating embodiment, multiple layers of both abradable and dense (non-porous) bond coats can be applied to the turbine shroud in succession, with the dense bond coat being applied in an initial process. A first non-porous, metallic oxidation resistant metal coating comprised of β-NiAl or MCrAlY such as CoNiCrAlY, NiCoCrAlY, FeCrAlY or NiCrAlY is adhered to the shroud, followed by a separate layer of an abradable coating comprising components (1) and (2) or (3) alone or, alternatively, components (1), (2) and (3). The dense bond coat layer provides oxidation resistance to the substrate materials and likewise can be applied to the shroud using thermal spray processes such as APS (air plasma spray), HVOF (hyper velocity oxy-fuel) or LPPS (low pressure plasma spray).

In a further embodiment, the application of an abradable coating comprising components (1) and (2) or (3) alone or, alternatively, components (1), (2) and (3) can be accomplished by a process that integrates sintering and brazing. The powder mix comprising components (1) and (2) or (3) or all three are initially blended. The powder mix then undergoes sintering in a vacuum, or a reduced or inert environment. After sintering, the preformed abradable coating can be joined to the shroud or engine component by brazing or other known joining methods.

In a further embodiment, the present invention provides a method of applying an abradable coating directly to the underlying substrate. There are many ways to direct-write or transfer material patterns for rapid prototyping and manufacturing on a surface. Typically, a micro pen type dispensing apparatus is employed, such as one manufactured by Ohmcraft or Sciperio. The abradable coating applied by the apparatus is controlled by a computer connected to a CAD/CAM having the desired pattern. The matrix powder is formulated to a consistency similar to that of toothpaste (usually called a "fluid slurry" or "ink"), and applied to the substrate at room temperature. The coating is then sintered at elevated temperature as is known in the art (conventional furnace treatment or local consolidation by laser or electron beams). The powder is formulated to the appropriate consistency using an alcohol such as terpineol. Cellulose may also be added to impart suitable flow characteristics to the powder. In the present application, the ink can contain a mixture of the metallic matrix with some predetermined amount of the ceramic microspheres. One advantage of the direct write technology is that it can be adapted to depositing on highly curved, nonplanar surfaces such as turbine components.

FIG. 1 of the drawings depicts the basic process for making a microballoon dispersion metal matrix composite (MDMMC) according to the invention. Microballoons having an average diameter of approximately 80 microns and a nominal shell thickness of about 10 microns are admixed thoroughly at low shear with the brittle intermetallic phase, such as β-NiAl as described above. The resulting abradable MDMMC structure containing the microspheres is then applied to the metal shroud using known application techniques (such as APS thermal spray) to form the final composite coating.

Figure 2:
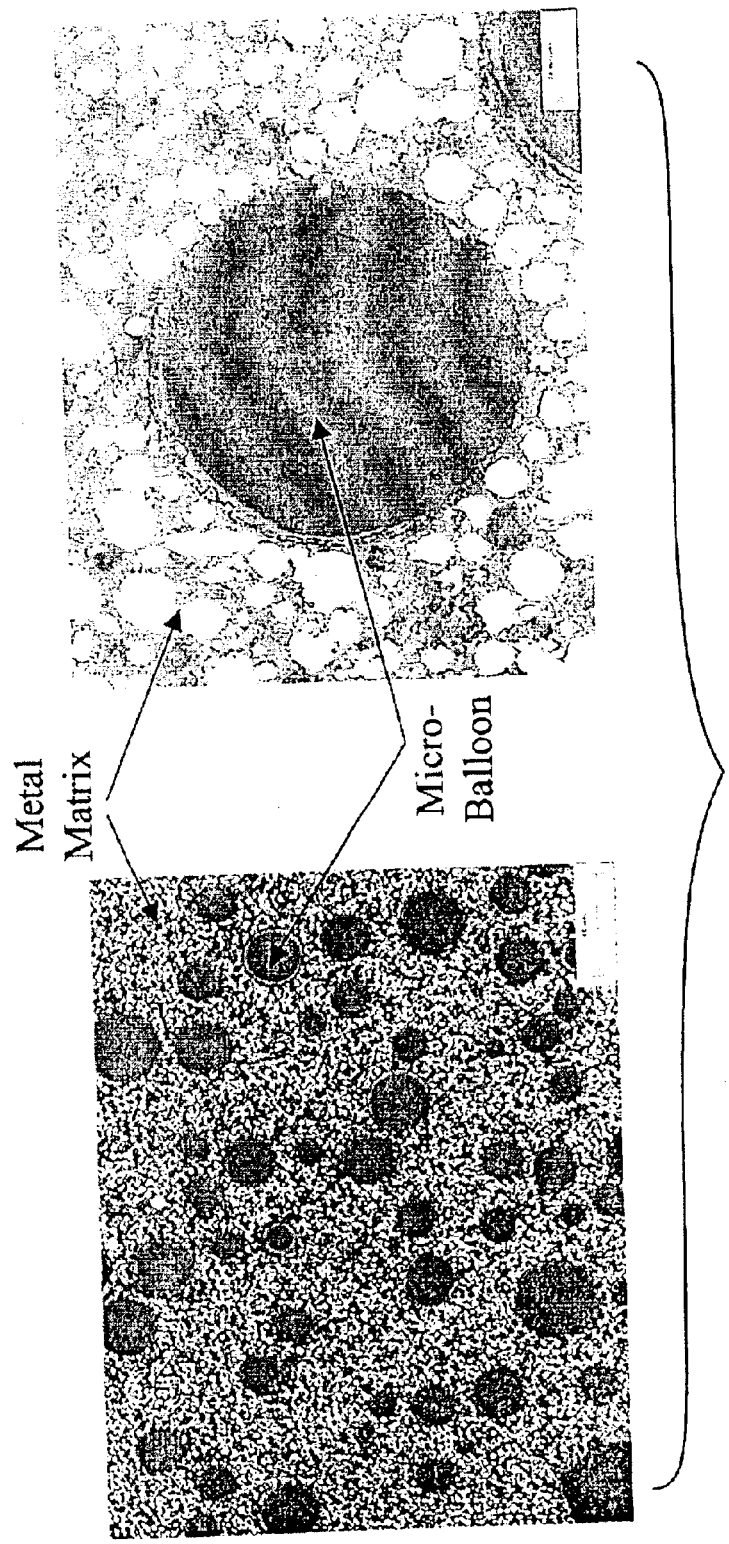
FIG. 2 depicts an exemplary microballoon dispersion metal matrix composite (MDMMC) according to the invention, showing the preferred uniform dispersion of microballoons (at two different levels of magnification) having varying sizes disposed within the matrix.
Figure 2A:
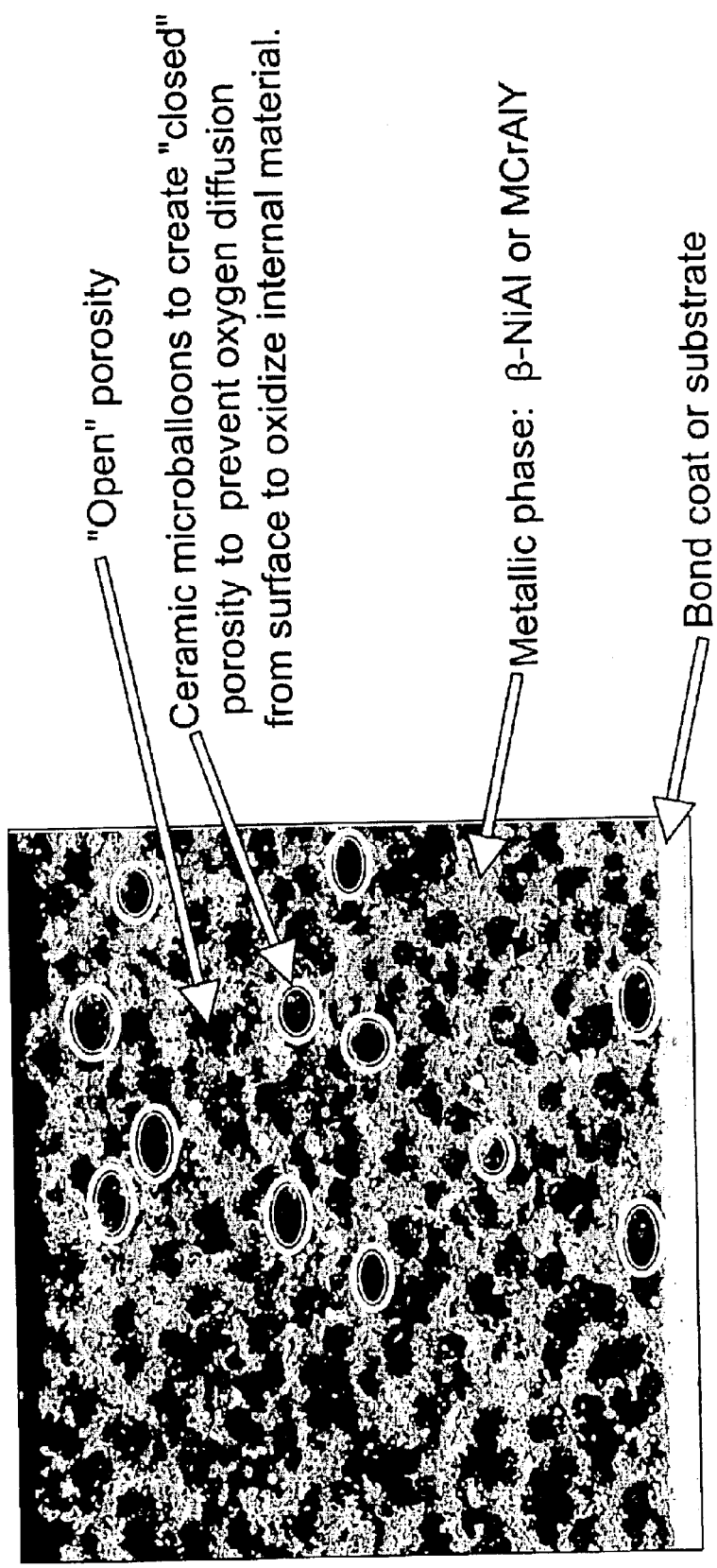
FIG. 2A depicts an exemplary microballoon dispersion, partly in illustration form, showing the "open" and "closed" porosity which together define the "total porosity" of the MDMMC.

FIGS. 2 and 2A of the drawings depict an exemplary microballoon-dispersion metal matrix composite according to the invention, showing the preferred uniform dispersion of microspheres having various sizes of ceramic microspheres within a prescribed range uniformly dispersed within the metal matrix, shown at low magnification (left side of FIG. 2) and high magnification (right side of FIG. 2). Preferably, the microballoons are dispersed such that the average size of the spheres remains relatively constant throughout the entire thickness of the abradable coating applied to the metal shroud.

Figure 3:
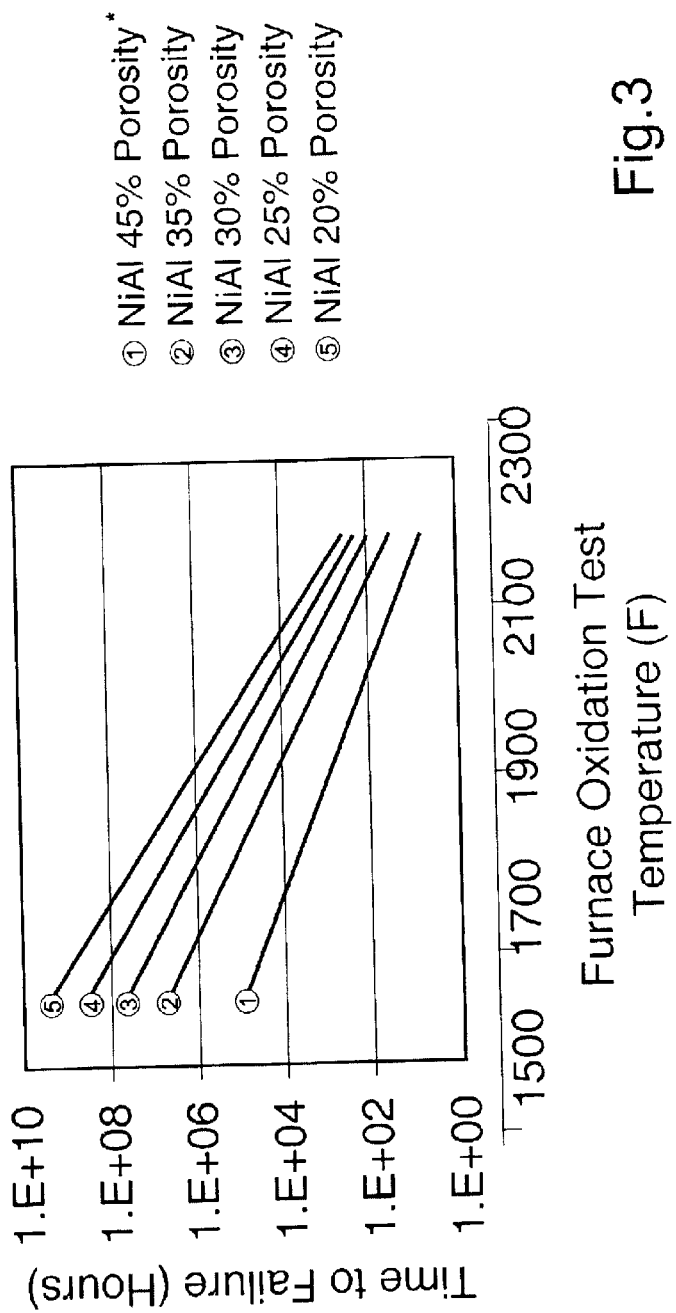
FIG. 3 shows the predicted oxidation life for different embodiments of the new abradable coating compositions, namely, coatings with varying levels of porosity due to the presence of corresponding different amounts of ceramic microspheres, and hence different levels of total porosity.

FIG. 3 of the drawings is a graphical representation of the predicted oxidation life for porous β-NiAl abradable coatings (with open porosity ranging from 20 to 45% by volume) that have been applied to the metal components of a turbine using conventional thermal spray techniques (such as APS). The oxidation data for the coatings with 45% and 35% open porosity are taken from actual oxidation experiments. The predicted failure of the different resulting coatings was then calculated and plotted against the maximum oxidation test temperature as shown. Using the same metal matrix containing β-NiAl, various amounts of dispersed microballoons can be added to achieve the total porosity (the sum of open and closed porosity) to improve the abradability at high temperature. For example, 20% by volume of microballoons can be added to a porous β-NiAl coating with 25% open porosity to produce an abradable coating with a total porosity of 45% by volume.

FIG. 3 indicates that the highest predicted oxidation life for abradable coatings according to the invention will result from compositions having a nominal 20% porosity level. The predicted oxidation plots on FIG. 3 are based on the following linear equations:

β-NiAl (45% open porosity): $y=5\times10^{15}\exp(-1.0156x)$

β-NiAl (35% open porosity): $y=2\times10^{20}\exp(-0.0197x)$

β-NiAl (30% open porosity): $y=5\times10^{22}\exp(-0.0217x)$

βNiAl (25% open porosity): $y=1\times10^{25}\exp(-0.0238x)$

β-NiAl (20% open porosity): $y=2\times10^{27}\exp(-0.0259x)$ where y represents the time (hours) to failure and x represents the temperature (° F.).

As discussed above, it has been found that the use of microballoons according to the invention will replace open porosity (which is normally formed by using fugitive materials such as PE followed by burn-out) with the closed porosity provided by the microballoon. As a result, the pores that are still open are substantially reduced providing more natural resistance to the ingress of oxygen and better overall oxidation resistance. As for abradability, it has also been found that the preferred total porosity (the sum of both the "open" and closed porosity within the dispersion) should remain high, i.e., around 45%, assuming the microballoons have a thin shell wall that can be abraded easily at high temperatures.

The abradable coating system in accordance with the invention can be used separately or in conjunction with reinforced bucket tips in order to provide even longer term reliability and improved operating efficiency. In most cases, bucket tipping will not be necessary. The same abradable coatings can be applied to both new and used equipment. In repair and/or retrofit applications, however, the coatings on existing gas turbine engine shrouds must be physically removed after the turbine or other hot gas path components are taken out of service for routine maintenance, with the new coatings being applied onto the metal using known bonding and coating techniques such as plasma spray.

The nominal physical properties of ceramic microspheres useful in abradable coatings according to the invention are shown below in Tables I, II, III and IV. Table I depicts the isostatic strength in psi, true density, particle size distribution in microns and the color of conventional ceramic microspheres manufactured by the 3M Corporation sold under the trade name Zeeospheres™. The microspheres consist of an alkali alumino silicate ceramic material. Table II is a similar microsphere comparison chart for a comparable product sold under the trade name Z-Light Spheres™. Table III summarizes the physical properties for the 3M product Z-light Spheres™. Preferably, the microspheres consist of a silica-alumina ceramic and have a shell thickness of between 5–20 microns. (See FIG. 1).

Table IV relates to an alternative embodiment of the present invention, namely abradable coatings containing fly ash as a substitute for at least a portion of the ceramic microballoons within the dispersion. As Table IV illustrates, the preferred fly ash component consists primarily of silicon dioxide, aluminum oxide and iron oxide. As with the ceramic microballoons, the fly ash component is added in a uniform dispersion with the metal matrix composite to help control the desired level of abradability without sacrificing oxidation resistance or strength of the coating at high temperatures.

TABLE II

Gray Z-Light Spheres ™ Ceramic Microspheres*

| Particle Size (microns) | G-3125 | G-3150 | G-3500 |
|---|---|---|---|
| 95th Percentile | 125 | 145 | 225 |
| 90th Percentile | 120 | 135 | 200 |
| 50th Percentile | 95 | 105 | 130 |
| 10th Percentile | 50 | 55 | 65 |
| Mean | 90 | 100 | 135 |

*Manufactured by the 3M Corp.

The gray Z-Light Spheres™ Ceramic Microspheres consist of low-density, fine particle size, hollow microspheres having the following typical physical properties.

TABLE III

| Shape | Hollow spheres with thin walls |
|---|---|
| Composition | Silica-Alumina Ceramic |
| Color, Unaided Eye | Gray |
| True Density | 0.7 gm/cc |
| Crush Strength | 140 kg/cm$^2$ (2,000 psi) |
| Chemical pH | 7 ASTM E 70 |
| Hardness | 5–6 Mohs Scale |
| Softening Point | 1,040° C. (1,900° F.) |
| Dielectric Constant | 1.8–1.9 |
| Thermal Conductivity | 0.2 W/mK |
| Surface Area (m$_2$/cc) | 0.2 |

TABLE IV

Exemplary Fly ASH Chemical and Physical Properties

| | ASTM C618 Limits | | ASTM Test Method |
|---|---|---|---|
| | Class F | Class C | |
| Chemical Analysis | | | |
| Silicon Dioxide (SiO$_2$) 49.3% | | | |
| Aluminum Oxide (Al$_2$O$_3$) 24.2% | | | |
| Iron Oxide (Fe$_2$O$_3$) 16.7% | | | |

TABLE I

Microspheres Comparison Chart[1]

| | Target Isostatic Strength | True Density | Distribution | | | Effective top size | Color (unaided eye) |
|---|---|---|---|---|---|---|---|
| | (90% survival, psi) | (g/cc) | 10th % | 50th % | 90th % | 95th % | |
| Composition: Silica-alumina ceramic | | | | | | | |
| G-200 | >60,000 | 2.5 | 1* | 4 | 9 | 12 | Gray |
| G-400 | >60,000 | 2.4 | 1 | 5 | 14 | 24 | Gray |
| G-600 | >60,000 | 2.3 | 1 | 6 | 24 | 40 | Gray |
| G-800 | >60,000 | 2.2 | 2 | 18 | 75 | 200 | Gray |
| G-850 | >60,000 | 2.1 | 12 | 40 | 100 | 200 | Gray |
| Composition: Alkali alumino silicate ceramic | | | | | | | |
| W-210 | >60,000 | 2.4 | 1 | 3 | 9 | 12 | White |
| W-410 | >60,000 | 2.4 | 1 | 4 | 15 | 24 | White |
| W-610 | >60,000 | 2.4 | 1 | 10 | 28 | 40 | White |

*Microns
[1]3M ™ Zeeospheres ™ Ceramic Microspheres.

TABLE IV-continued

Exemplary Fly ASH Chemical and Physical Properties

|  |  | ASTM C618 Limits | | ASTM Test Method |
| --- | --- | --- | --- | --- |
|  |  | Class F | Class C |  |
| Sum of Constituents | 90.2% | 70.% min | 50.0% min | D4326 |
| Sulfur Trioxide ($SO_2$) | 0.4% | 5.0% max | 5.0% max | D4326 |
| Calcium Oxide (CaO) | 2.7% |  |  |  |
| Moisture Content | 0.2% | 3.0% max | 3.0% max | C311 |
| Loss on Ignition % carbon | 2.3% | 6.0% max | 6.0% max | C311 |
| Available Alkalies, as $Na_2O$ |  | 1.5% max | 1.5% max | C311 |
| Physical Analysis |  |  |  |  |
| Fineness, % retained on #325 | 13.3% | 34% max | 34% max | C311, C430 |
| Strength Activity with Portland Cement |  |  |  |  |
| 7 day, % of control | 91% | 75% min | 75% min |  |
| 28 day, % of control |  | 75% min 105% max | 75% min 105% max |  |
| Water Requirement, % control | 97% | 0.8% max | 0.8% max | C311, C151 |
| Autoclave Soundness |  |  |  |  |
| True Particle Density | 2.52 |  |  |  |

As noted above, the typical metal matrix coating materials according to the invention include a high concentration of Al, Cr, Ti or other stable oxide-former elements. After combining the microspheres with the metal matrix complex, the entire mixture can be applied to the metal shroud at high temperature using, for example, thermal spray techniques. If necessary, a suitable thinner, such as soap, topienio or an organic solvent can be used during the initial mixing to ensure better uniformity. When using conventional brazing techniques, the abradable coating material can also be mixed with a small amount of low melting-point metallic powder containing Si, Pd or other melting-point suppressants in order to adjust the firing temperature. alternatively, the final, i.e., complete MDMMC composite layer containing the microballoons can be formed initially and then applied to the metal shroud as a separate, integral abradable coating layer using conventional brazing techniques known in the art.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An abradable coating system applied to the metal shroud of a gas turbine engine, comprising a porous metal coating containing about 20% to 55% by volume of silica-alumina ceramic microspheres having an average size of between about 10 microns and 200 microns in diameter and a nominal shell thickness of between 3–20 microns, said ceramic microspheres being dispersed in a metallic oxidation-resistant alloy matrix consisting essentially of MCrAlY, wherein "M" designates Co, Ni or Fe, together with monolithic intermetallic β-NiAl comprising about 68 wt % Ni and 31 wt % Al.

2. An abradable coating system according to claim 1, wherein said porous metal coating has total open and closed porosity levels of between about 20% and 55%.

3. An abradable coating system according to claim 1, wherein said ceramic microspheres have an average size of about 80 microns in diameter.

4. An abradable coating system according to claim 1, wherein said abradable coating is applied to the metal shroud of said gas turbine engine at a thickness of between 40 and 60 mils.

5. An abradable coating system according to claim 1, further comprising a laminate structure that includes a dense bond coat layer containing a metallic oxidation-resistant superalloy having no added porosity and a second, porous abradable layer containing ceramic microballoons and a brittle intermetallic phase dispersed within a metallic oxidation-resistant matrix.

6. An abradable coating system according to claim 1, further comprising fugitive polymers of polyester or polyimide for adjusting the final porosity of said porous metal coating.

7. An abradable porous metal coating applied to the metal components of gas turbine engines exposed to high temperatures, said porous metal coating comprising: (a) a metallic oxidation-resistant matrix phase consisting essentially of MCrAlY, wherein M designates Co, Ni or Fe; (b) a plurality of hollow silica-alumina ceramic microspheres uniformly dispersed within said metallic oxidation-resistant matrix phase, said microspheres having an average shell thickness of between 3 and 20 microns, an average diameter of about 80 microns and a total open and closed porosity level of about 20% and 55% by volume of said porous metal coating; and (c) a brittle intermetallic phase comprising (β-NiAl in an amount sufficient to increase the brittle nature of said metallic oxidation-resistant matrix phase at elevated temperatures without reducing the oxidation resistance of said porous metal coating.

8. An abradable porous metal coating according to claim 7, wherein said a-brittle intermetallic phase comprising β-NiAl consists of about 68.5 wt % Ni and 31.5 wt % Al.

9. An abradable porous metal coating according to claim 7, further comprising a fugitive polymer included with said silica-alumina ceramic microspheres for adjusting the porosity level and abradability of said porous metal coating, said fugitive polymer being burned off without leaving any residue or ash when said porous metal coating is applied to said metal components.

10. An abradable porous metal coating according to claim 9, wherein said fugitive polymer comprises polyester or polyimide.

11. An abradable porous metal coating according to claim 7, further comprising a solid lubricant phase of hexagonal boron nitride (hBN).

12. An abradable porous metal coating according to claim 7, further comprising fly ash consisting of silicon dioxide, aluminum oxide and iron oxide dispersed within said metallic oxidation-resistant matrix phase.

* * * * *